Aug. 12, 1958 J. H. WORTHEN 2,846,871
AIR GAGE APPARATUS
Filed Jan. 27, 1956
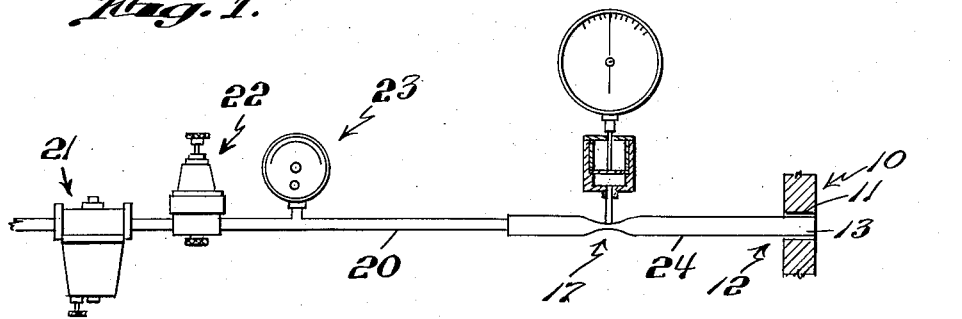
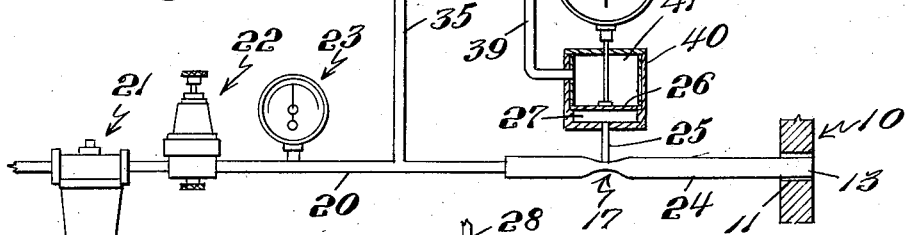
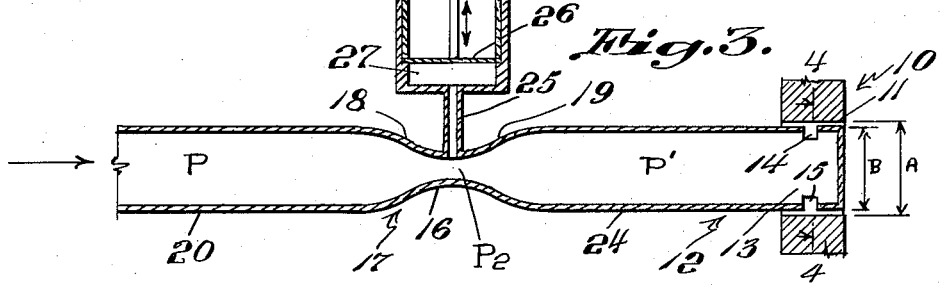
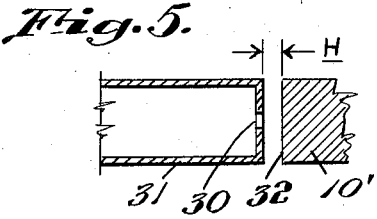
INVENTOR.
John H. Worthen
BY
Barlow & Barlow
ATTORNEYS.

United States Patent Office 2,846,871
Patented Aug. 12, 1958

2,846,871

AIR GAGE APPARATUS

John H. Worthen, Warwick Neck, R. I., assignor to Federal Products Corporation, a corporation of Rhode Island Application January 27, 1956, Serial No. 561,824

1 Claim. (Cl. 73—37.9)

This invention relates to an air gage system in which the amount of escaping air from the jets of a plug or ring or other similar device will indicate the size of work.

In systems of this type which have heretofore been in use, there has been a time lag for proper size indication from the initial time that the plug was inserted into the work until equilibrium was established due in such system to the necessity for the air to fill up passages into which it would flow in order that the balanced relation might be established before the sensing device came to a rest for indicating the proper measurement for indication.

One of the objects of this invention is to provide an arrangement in the system which will cut down this lag of proper indication so that indication may more quickly respond after the insertion of the gaging plug in the work piece.

A more specific object of the invention is to provide a converging-diverging nozzle through which the air passes to the measuring plug with an arrangement of the area of the openings in the plug such that recompression takes place in the diverging section of the nozzle and a substantially constant pressure may be maintained between the nozzle and the plug.

Another object of the invention is to provide a sensing device connected to the restricted part of the converging-diverging nozzle which will directly indicate the size of the work.

Another object of the invention is to substitute a converging-diverging nozzle for a restriction heretofore used in the line and the use of the pressure sensing device directly from this nozzle rather than from a point between the restriction heretofore used and the measuring plug.

With these and other objects in view, the invention consists of certain novel features of construction as will be more fully described and particularly pointed out in the appended claim.

In the accompanying drawing:

Figure 1 is a diagrammatic view showing the apparatus of this invention;

Figure 2 is a similar view showing a modified form;

Figure 3 is a sectional view on a larger scale of the portion of the apparatus which involves essentially this invention;

Figure 4 is a section on line 4—4 of Figure 3; and

Figure 5 is a sectional view of a plug of modified form in relation to a work piece.

In proceeeding with this invention, I provide in the air supply from a regulator, which is made to supply as constant a supply as mechanically possible, a converging-diverging nozzle having throat portion, and from the throat portion I tap off a pressure sensing device, which usually comprises a diaphragm to which is lead as small a volume of air as practical. This nozzle is then connected to a measuring plug which will have one or more jets to impinge against the work in connection with the measuring of the same. The total cross sectional area of the jets will be essentially equal to the cross sectional area of the restricted portion of the nozzle. Due to friction losses the area of these jets may be slightly larger than the area of the restricted portion of the nozzle. By this arrangement, the pressure on the supply side to the nozzle and the pressure between the nozzle and jets will be substantially the same although due to friction losses the pressure between the nozzle and jets is slightly less than the pressure of the supply to the nozzle. The restriction at the plug because of the work being placed adjacent the jets will cause variation of pressure in the restricted portion of the nozzle and the work which restricts the jets in accordance with its size will cause a response in the sensing device to indicate through any one of various means the size of the work.

The cross sectional area of the plug jets is essentially equal to the cross sectional area of the nozzle which will maintain the pressure between these two substantially equal to the pressure supplied to the nozzle with no work piece in place. With a work piece in place the variation in the escape of air dependent on the esize of the work being gaged will be quickly reflected at the throat of the nozzle and consequently in the sensing device. The only part of the device which needs to fill up with air in order that a correct balance and indication is obtained is the conduit from the restricted portion of the nozzle to the indicating device which will be made as small as possible.

With reference to the drawings, the work designated 10 has a hole 11 therein to be gaged. The plug which is going to gage this hole is designated generally 12 and comprises portion 13 which may be inserted into the hole with jets 14 and 15, shown two in number in this instance, although any different number may be utilized, located at diametrically opposite points and through which air will escape and impinge against side walls of hole 11. The total cross sectional area of the jet means comprising the summation of the areas of the openings 14 and 15 will be substantially equal to the cross sectional area of the throat 16 so that when no work is about the plug, the pressure in the conduit between the nozzle and the plug will not appreciably change. It will be appreciated that if the jets were closed, then the whole system would be at the pressure of the air supplied denoted herein P. However, if the summation of the cross sectional areas of openings 14 and 15 is greater than the cross sectional area of the throat 16, then as the surface being measured moves away from openings 14, 15, the pressure P' in the conduit between the throat and jet openings 14, 15 will substantially equal the supplied pressure P until the curtain area of the jets equals the cross sectional area of the throat, which determines the critical pressure and that if the curtain area of the jets is further increased by moving the surface further away, then the pressure P' will start to fall while the pressure $P_2$ will remain at substantially the critical pressure. When the work piece 10 is in place, the amount of air which escapes through the jet openings is dependent upon the circumference of the opening and the distance the plug is from the wall of the hole 11 in work piece 10. Thus, the circumference of the jet openings multiplied by the distance of the plug from the wall of hole 11 will be the limiting area through which the air will escape and is also known as the curtain area. The less the distance, which will be the diameter of the opening A minus the diameter of the plug B (Fig. 3) or H, (Fig. 5), the greater will be the pressure $P_2$ in the restricted throat portion 16 of the nozzle, designated generally 17, and comprising a converging portion 18 and diverging portion 19 on the other side of the restricted throat portion. In the illustrated embodiments, a conduit 20 to this nozzle 17 will act to supply air received through filter 21 and regulator 22 which will be as near constant as possible and frequently near thirty pounds, although this may vary. This pressure is indicated P and will appear on the gage 23.

The conduit between the nozzle and plug is designated 24 and will be of such size as to conduct air from the nozzle and will be under a pressure of P' which except for mechanical losses will be substantially the same as the pressure P. A conduit 25 taps into restricted part 16 of nozzle 17 and conducts air from this portion to the under side of diaphragm 26. The size of this conduit 25 and chamber 27 beneath the diaphragm is made as small as possible so that air which must fill this will do so quickly. The diaphragm has some means such as 28 attached to it from which an indication may be had either mechanically or electrically in a dial 29. Various ways of indicating this movement may be had as will be readily apparent.

The openings 14 and 15 will usually be rectangular in shape in order that their periphery may be enlarged in relation to the cross sectional area. The relationship of the periphery of these openings to the throat area determines the magnification of the indication which I obtain in the throat. Thus, by forming the openings rectangular instead of circular, a larger periphery is obtained and a greater magnification is obtained in the pressures of the throat. Also by increasing the number of openings, this peripheral extent may be increased.

While I have shown two openings in Figures 1, 2 and 3, a single opening 30 may be provided as shown in the nozzle 31 in Figure 5 to project against a work piece 10'. Here the distance H between the jet opening 30 and the wall 32 of the work piece would provide the amount of air that would escape, and the circumference of this opening 30 multiplied by the distance H would be the limiting area for the escaping air. Thus, if the distance H were made smaller, the amount of air would be smaller, and the pressure P2 in the throat would increase.

In the showing in Figure 2 I have provided an arrangement which gives me a somewhat more uniform and balanced arrangement than that shown in Figure 1. Here a conduit 35 is taken from the conduit 20 between the nozzle and the regulator so as to form a branch line, and in this branch line I provide a reducing mechanism 36 with an adjustable control 37 at the end of this line so that I may cause the pressure between the mechanism 36 and 37 at 38 to balance the pressure in the throat portion 17, and I provide a conduit 39 extending to the cylinder 40 and above the diaphragm 26 so that when no work is being gaged, the pressures in the chamber 27 and that above the diaphragm 41 will be a predetermined amount. Thus, as the pressure rises in the throat at $P_2$ when the work is being gaged, the indicator will work as heretofore. It will, of course, be understood that a duplicate converging-diverging valve might be substituted in place of the restriction 36 if desired, although ordinarily a less expensive mechanism than the converging-diverging valve may be located in this line at 36 for this purpose.

I claim:

An air gage apparatus comprising a measuring plug, a conduit from an air supply to said plug, a nozzle in said conduit through which the air passes, said nozzle having a converging-diverging passage forming a throat, said plug having jet means comprising at least one opening therein through which air is exhausted the flow of which may be restricted by proximity of the work gaged, said jet means having a cross sectional area substantially equal to the cross sectional area of said throat to maintain the air pressure between the throat and plug substantially constant, and means connected to said throat to indicate changes in pressure at the throat in response to the amount of restriction of the jet means by the work gaged.

References Cited in the file of this patent

UNITED STATES PATENTS

| | | |
|---|---|---|
| 1,940,921 | Smith | Dec. 26, 1933 |
| 2,357,569 | Wright | Sept. 5, 1944 |
| 2,513,374 | Stead et al. | July 4, 1950 |
| 2,523,564 | Fortier | Sept. 26, 1950 |
| 2,539,624 | Huggenberger | Jan. 30, 1951 |

FOREIGN PATENTS

| | | |
|---|---|---|
| 699,779 | Great Britain | Nov. 18, 1953 |